H. TODD.
Polishing Sheet Metal.
No. 2,564. Reissued April 16, 1867.
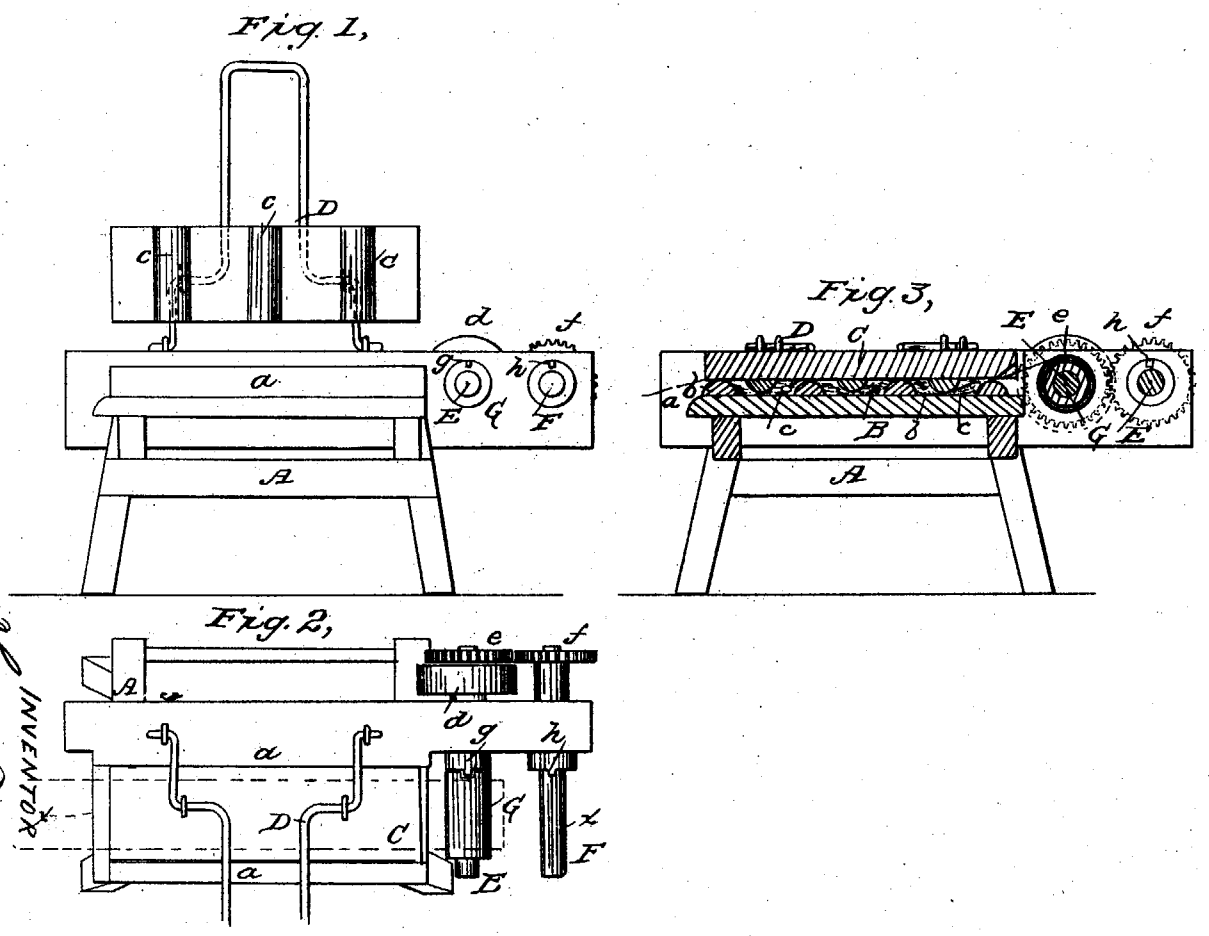
WITNESSES
J. N. Coombs
J. W. Reed
INVENTOR
Henry Todd
By his attorneys
Brown Coombs & Co
N. PETERS, Photo-Lithographer, Washington, D. C.

United States Patent Office.

THE BRIDGEPORT BRASS COMPANY, OF BRIDGEPORT, CONNECTICUT, ASSIGNEES OF HENRY TODD.

*Letters Patent No.* 62,703, *dated March* 5, 1867; *reissue No.* 2,564, *dated April* 16, 1867.

IMPROVED MACHINE FOR GRINDING SHEET METALS.

The Schedule referred to in these Letters Patent and making part of the same.

TO ALL WHOM IT MAY CONCERN:

Be it known that HENRY TODD, of Bridgeport, in the county of Fairfield, and State of Connecticut, invented a new improvement on Machinos for Scouring Sheet Brass and other Metals or Materials; and we do hereby declare the following, when taken in connection with the accompanying drawings and the letters of reference marked thereon, to be a full, clear, and exact description of the same, and which said drawings constitute part of this specification, and represent, in—

Figure 1, a side elevation of a machine constructed according to his improvement, in its open condition.

Figure 2, a plan of the same closed, with a sheet of brass in the act of being scoured; and in Figure 3, a vertical section through the line *x x* in fig. 2.

This invention relates more particularly to a mechanism for scouring sheet brass before polishing it by the finishing rolls, but is alike applicable to the scouring of other metals, and consists in a novel construction of scouring trough and presser, forming fixed surfaces of a corrugated or other suitable character, holding the scouring material, and through and between which the sheet is drawn under pressure; and in order to the better understanding of this invention, as well as to enable others to construct and use the same, we will proceed to a description thereof, as illustrated in the accompanying drawings.

A represents the frame of the machine, which may be of any suitable description. B is a trough, having sides *a a*, and strips or projections *b*, preferably of a rounded character, across its bottom, which may be of wood or other material; and C is a presser, shutting down upon or within the trough, having similar strips, *c*, arranged to lie between the lower strips *b*, or, instead of the strips *b c*, the interior faces of the trough and presser, which form fixed surfaces, may be of a regular waved or corrugated construction, to permit of a like passage of the sheet between them. The presser C may either be hinged in a transversely rocking or loose manner by a lever, D, to the frame, so as to admit of its accommodating itself to a parallelism with the trough, and of weight being thrown on or applied to it, or it may be raised or lowered, and its pressure adjusted by means of a screw arranged to occupy a vertical position over it. E F are transverse shafts situated at one end of the machine, outside the trough and presser. These shafts, of which E may be the driver, by means of a pulley, *d*, are rotated in opposite directions, and the outer shaft F preferably the fastest, by gears *e f*, or otherwise. On either of the inner overhanging portions of these shafts, according to the operation to be performed, a sleeve, G, fits by sliding it thereon, and causing it to lock with a key, *g* or *h*, so as to be rotated by such one of the shafts as it is fitted on to.

Supposing sand and water or other suitable scouring material to be supplied to the trough, or it may be tow or other soft material saturated with the scouring substance furnished to the trough and presser, and the sheet of brass arranged to lie in or through such scouring material, and in between the trough and presser, with suitable weight or force applied to the latter; then, by drawing on the one end of the sheet, and hitching it on to or giving it bite on the sleeve G, arranged to rotate with the shaft E, and during such operation forming part of it, said sheet will be forcibly drawn through the ribbed or corrugated scouring surfaces of the trough and presser, and scouring the material contained between them by the rotation of the sleeve G on which the scoured sheet tightly winds or wraps. The sleeve G with the sheet on it is then slipped off the shaft E and fitted on to gear with the reversely-rotating shaft F, when, by slightly pressing on the sheet, it will loosen itself so as to admit of being easily slipped off from the sleeve, when it may be removed to the finishing rolls.

This invention has been thus far described as being constructed with two shafts, E F, with a sleeve to be changed from one to the other, as the case may be, yet a single shaft may be employed, constructed with an arrangement of gearing so as to reverse the direction of revolution, in the usual manner for a like reverse in machines for other purposes, and the same object be accomplished, that is, to remove the scoured metal which has been tightly wound on the shaft. In this case the sleeve is not essential, as the sheet may be attached directly to the shaft; or, if preferred, reciprocating jaws may be arranged to grasp the metal near the exit from the trough, drawing it out to the distance of their movement, opening and returning, again grasp the sheet, and so continuing.

Having thus fully described this invention, what we claim as the invention of the said HENRY TODD, is—

1. The combination of the trough B, provided with strips or corrugations *b*, and presser C, constructed substantially in the manner described, so as to scour the surface of sheet metal drawn therethrough.

2. The combination of the trough B, provided with strips or corrugations *b*, and presser C, provided with strips or corrugations *c*, with the mechanism constructed and arranged so as to draw the sheet between the scouring surfaces of the trough and presser, substantially as specified.

3. In combination with the trough B, and presser C, the removable sleeve G, and reversely-rotating shafts E and F, essentially as and for the purposes herein set forth.

BRIDGEPORT BRASS COMPANY,
*Assignees of Henry Todd.*
By D. W. KISSAM, *Secretary.*

Witnesses:
A. J. TIBBITS,
JOHN H. SHUMWAY.